June 2, 1970 J. F. BUTTERFIELD 3,515,492

COMBINED PHYSICAL COLOR AND SUBJECTIVE COLOR

Filed March 24, 1967 6 Sheets-Sheet 1

JAMES F. BUTTERFIELD
INVENTOR.

BY Lyon & Lyon

ATTORNEYS

June 2, 1970 J. F. BUTTERFIELD 3,515,492

COMBINED PHYSICAL COLOR AND SUBJECTIVE COLOR

Filed March 24, 1967 6 Sheets-Sheet 2

JAMES F. BUTTERFIELD
INVENTOR.

BY Lyon & Lyon
ATTORNEYS

June 2, 1970 J. F. BUTTERFIELD 3,515,492

COMBINED PHYSICAL COLOR AND SUBJECTIVE COLOR

Filed March 24, 1967 6 Sheets-Sheet 3

JAMES F. BUTTERFIELD
INVENTOR.

BY Lyon & Lyon
ATTORNEYS

COMBINED PHYSICAL COLOR AND SUBJECTIVE COLOR

Filed March 24, 1967 6 Sheets-Sheet 4

JAMES F. BUTTERFIELD
INVENTOR

BY Lyon & Lyon
ATTORNEYS

JAMES F. BUTTERFIELD
INVENTOR.

BY Lyon & Lyon
ATTORNEYS

June 2, 1970 J. F. BUTTERFIELD 3,515,492

COMBINED PHYSICAL COLOR AND SUBJECTIVE COLOR

Filed March 24, 1967 6 Sheets-Sheet 6

JAMES F. BUTTERFIELD
INVENTOR.

BY Lyon & Lyon
ATTORNEYS

United States Patent Office 3,515,492

Patented June 2, 1970

3,515,492
COMBINED PHYSICAL COLOR AND SUBJECTIVE COLOR

James F. Butterfield, Van Nuys, Calif., assignor to The Battelle Development Corporation, Columbus, Ohio, a corporation of Delaware Filed Mar. 24, 1967, Ser. No. 625,813
Int. Cl. G09f *19/12, 13/34*
U.S. Cl. 356—256 20 Claims

ABSTRACT OF THE DISCLOSURE

Physical color and subjective color may be combined to provide mixed color or saturated color. This may be accomplished by modulating light eminating from a physical color in accordance with a subjective color code, such as by modulating a physical color light source in accordance with a subjective color code, and if the code is one for producing a subjective color of the same hue as the physical color the result will be highly saturated color. These concepts may be used in conjunction with color television, lasers, signal lights, displays, and the like. Also disclosed is the modulation of a light source with a complex code to provide subjective color.

Reference is made to applicant's copending application Ser. No. 307,976, filed Sept. 10, 1963, and entitled "Subjective Color System," now Pat. No. 3,311,699 and to applicant's copending application Ser. No. 625,783 filed concurrently herewith and entitled "Production of Subjective Color by Animation Techniques," the disclosures of which are incorporated herein by reference.

This invention relates to methods and apparatus for combining physical color and subjective color and for obtaining higher saturations of color.

By physical color, it is meant the color that one is normally acquainted with such as the blue of the sky, the red of a stop light and the green of the grass. These are objects which either refract, produce or reflect certain wavelengths of light. When this physical colored light falls on the receptors (cones) of the eyes, it causes a signal to be sent over the optic nerve to the cortex of the brain. The receptors apparently are able to determine the specific wavelength of the light falling on them and they generate an apprporiate coded signal for transmission via the optic nerve. The cortex identifies the signal as having the code for a particular color of light.

The greater percentage there is of a particular wavelength of light falling on a specific group of the receptors of the eye, the greater the color saturation of that particular source of color. If some white, or other hues of light, are mixed with the particular colored light, the saturation is decreased. However, if the light is nearly all of one particular wavelength, the saturation is very high and theoretically if all the light were of a particular wavelength, the saturation would be one-hundred percent. In nature, highly saturated objects or sources of light are unusual. Highly saturated artificial lights are usually dim because of the low transmission of the narrow band filters required, and large amounts of energy are required to obtain a reasonable amount of light. An exception is the laser which may be highly monochromatic, i.e., saturated in one color, but lasers have a number of limitations which limit their use.

There has been investigation and observation of the subjective color phenomenon over the years. Benedict Prevost is credited with discovering this phenomenon in the early eighteen hundreds. Subsequently, J. R. Fechner experimented with black and white rotating discs. Approximately half a century later C. E. Benham designed a disc having only black and white patterns thereon, some of which would appear in color when the disc was rotated. The repetition of certain sequences of light and dark areas apparently is interpreted by the eye and brain as color, and the composition of the sequence and rate of repetition determine the characteristics of the color. U.S. Pat. No. 2,844,990 to Nagler et al. described production of subjective color by presenting a series of pictures with motion picture or television equipment. This is accomplished by preparing individual film frames wherein the areas to appear in subjective color are formed by a plurality of spaced black and white lines or cross hatching.

In Pat. No. 3,311,699 noted above, there are disclosed for producing subjective colors several methods and arrangements of making areas or color components appear light and dark in certain sequences rather than by using spaced lines or cross hatching as disclosed by Nagler et al. According to said patent, "live" pickup of a scene or image may be accomplished through the use of filter means in conjunction with a television or motion picture camera. Said corresponding application entitled "Production of Subjective Color by Animation Techniques" relates principally to the production of selected subjective colors in a relatively simple manner through the use of animation techniques.

It is the primary object of this invention to provide a method and apparatus for combining physical color and subjective color to thereby obtain saturations of color higher than is normally possible with either physical color or subjective color alone.

Another object of this invention is to obtain saturations from a given source of color which are higher than the source normally provides without requiring a corresponding incease in the total energy output of the source, and without a significant increase in the energy input.

A further object of this invention is to enable signal lights (navigation, railroad, traffic, space, under water, surface, airline, etc.) to be more saturated and therefore perceivable against a backgrounud of illumination noise over greater distances than normally is possible.

Another object of this invention is to add subjective color to illuminated and other advertising displays in a manner to enable certain of the illuminated parts to appear in highly saturated hues periodically or continually.

Still another object of this invention is to combine physical color with subjective color in the pickup, transmission or reception of television, motion pictures or other types of communication or displays. This is particularly useful in the production of subjective color on television equipment, such as described in said Patent No. 3,311,699 wherein the color produced is not highly saturated. The combination of physical color with less saturated subjective color provides pictures of high saturations. This also stabilizes the subjective colors, makes them uniform through the colored area and can reduce flicker.

Furthermore, it is an object of the invention to enable the addition of subjective color to the entire image, or to certain areas of the image, in physical color communication systems (for example, NTSC color television, color motion pictures, etc.) to thereby emphasize all or certain areas of the picture or obtain colors or saturations not normally available with the particular optical communication means.

Another object of this invention is to combine physical color and subjective color of different hues to produce a mixed hue. This is particularly useful with lasers and other sources where only one narrow band hue is possible from a particular source while yet another hue is required for a particular use.

In the subjective color literature and in recent tests, it has been determined that many color-blind individuals can see subjective colors of hues to which they are normally blind. For example, a protanope may not normally see physical red probably because his physical red reception mechanisms are defective. However, he may see subjective red because the remainder of his color identifying mechanism is intact. Subjective color bypasses the physical color mechanism of the receptors sending a signal to the cortex similar to that which the receptor might have sent. Therefore, a further purpose of this invention is to subjectively code physical color lighting so that many who are color-blind can identify its color. This is particularly applicable to signal lights.

Briefly, these and many other objects and advantages of this invention are attained by combining physical color and subjective color. The point of combination may be at the actual source of either the physical or subjective color, at some point in between, or at the eye.

For example, a source of physical color such as a red stoplight may be modulated with the subjective color code for red. This involves flashing the red light in a particular manner. One method involves adding a white surround around the red area and flashing the white surround and the red area off and on in a particular manner. Another method is to only flash the red area in a more complex manner. It may be assumed that the normal saturation of the physical red color is sixty-five percent. It also may be assumed that if there were merely a white light flashing to give a subjective color stimuli of red, the saturation of the subjective red color stimuli would be twenty-five percent. Now, when the physically colored red stoplight is modulated with the subjective red code of approximately the same wavelength of red, then the stoplight is perceived at a higher saturation than it would be normally. This saturation appears to be almost a simple summation of the two, that is, ninety percent. Whether the saturation could reach or be more than the theoretical one-hundred percent is still not clear. Another useful example is modulation of physical red laser light with the subjective green code thereby producing yellow light which may be desired for a particular purpose.

Another particularly useful application is in color television. For example, the physical blue colored word "new" in the production of a color television commercial may be modulated with the subjective code for blue so that this word appears more saturated on a color set than the phosphors of the color tube are normally capable of producing. Another application is to selectively add subjective color to physical colored displays of various kinds, e.g., radar, command, sonar, teaching machines, and so forth, so that certain areas of information can be emphasized or treated specially.

These and other objects and features of the present invention will become apparent through a consideration of the following description taken in conjunction with the drawings in which.

Figure 1A:
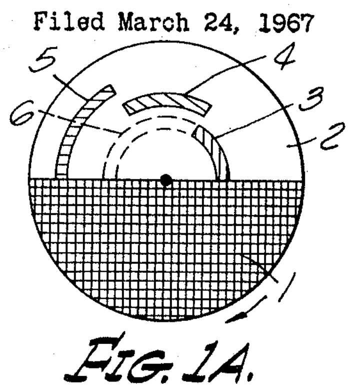
FIG. 1A illustrates a Benham-type disc useful in explaining the addition of subjective color and physical color.

Referring now to the drawings, FIG. 1A illustrates a typical Benham-type disc which is rotated in a clockwise direction at 3.5 to 20 revolutions per second (r.p.s.). The disc consists of black opaque sector 1 and white sector 2. White sector 2 has three arc segment lines; a red creating line 3, a green creating line 4, and a blue creating line 5. The white arc segment 6 immediately follows line 3, and is indistinguishable from white sector 2.

These lines in a Benham disc are black when the disc is stationary. When the disc is rotating clockwise, the inner line 3 appears as a reddish blur circle, the middle line 4 appears as a greenish blur circle, and the outer line 5 appears as a bluish blur circle. The exact subjective color of each line can be determined by comparing it to a color system, such as the color chips in the Munsell Book of Colors, in accordance with the teachings in said above application entitled "Production of Subjective Color by Animation Techniques." Assume, for example, that the subjective red color of line 3 can be designated by Munsell Notation 5.0 R 5/10, the subjective green of line 4 can be designated 5.0 G 5/4, and the subjective blue of line 5 can be designated 7.5 PB 3/10.

Now assume that in FIG. 1A there is illustrated a Benham-type disc which has arc lines 3, 4 and 5 physically colored (paint, ink or other material may be employed) according to the Munsell notation. That is, line 3 may be made from 5.0 R 5/10 Munsell paper, line 4 made from 5.0 G 5/4 paper, and line 5 made from 7.5 PB 3/10 paper. In other words, lines 3, 4, and 5 have been made of physically colored paper of the exact same shade that they will appear in subjective color. In actual practice the color hue and value are maintained, but higher saturations of physical color are used since they are easier to obtain.

When the disc in FIG. 1A is revolving clockwise, the line 3 appears a bright red, the line 4 appears a bright green, and the line 5 appears a bright blue. The saturation (chroma) in each case is greater than the saturation of the colored paper alone (when the disc is stationary). The saturation of the colored lines when the disc is revolving is a summation of the saturation of the subjective color and the saturation of the physical color. Also, the values (brilliancy) of the colors appear greater.

A substantiative demonstration of the combination of subjective color and physical color can be made by reversing the direction of rotation of the disc. Counterclockwise rotation results in line 3 creating a subjective blue which adds to the physical red color of the line to make it appear a magenta. Line 4 remains a bright green because it still appears as a combination of subjective green and physical green regardless of the direction of rotation. Line 5 appears magenta because now it creates a subjective red which is combined with the physical blue color of the Munsell paper. The magenta colors of lines 3 and 5 will be nearly identical if the subjective and physical colors are well matched.

Therefore, the combination of subjective and physical color is additive; however, when different hues are combined a mixed color results. For highest saturations care must be taken in selecting subjective and physical colors of exactly the same hue or the result will be a mixed color of only medium saturation.

A further interesting case is the combination of two complementary colors on a white background. For example, the physical color cyan can be combined with subjective red. The result is a white color which blends in and disappears into the white background.

A further interesting cause is to use, for the physical color, fluorescent paper, which appears highly saturated. The combination of the fluorescent effect, physical color and subjective color is brilliant and very highly saturated.

The additive effect is more notable with blues and reds and less so with yellows and greens. This seems to occur because physical blues and reds are most highly saturated when they are of lower color value (darker, that is, containing less white). The darker the physical color, the greater the subjective color effect. For example, if line 4 were light gray, it would not be as saturated a subjective color as if it were dark gray or black. Physical colored yellows and green are most highly saturated when they are of higher color values (lighter, i.e., containing more white), but the subjective color effect is not as pronounced with these colors. To compensate for this, physical colored yellows and greens should be selected with lower color values (darker) than normal when they are combined with subjective hues.

At these slow speeds (3.5 to 20 r.p.s.), there is a white flash occurring in saturated lines 3, 4 and 5. This is an undesirable effect and causes each line to have less average saturation because it is physically and/or subjectively colored 1/6 of a cycle and is white 2/6 of a cycle; the remaining 3/6 of the cycle is black.

However, if the disc in FIG. 1A is spun at high speed, for example, 20 r.p.s. and above, the subjective color effect will be almost nonexistent and the lines will appear only in physical color. Then, the physical color will be considerably less saturated. This results, in the case of red for example, because the disc is turning fast enough for the white arc segment 6 to mix with the physical red color of the line 3 and result in a desaturated physical red color. Black sector 1 has no effect on this desaturation. The same effect occurs with green and blue. Also black sector 1 causes considerable flicker at slow speed which disappears at high speed.

Figure 1B:
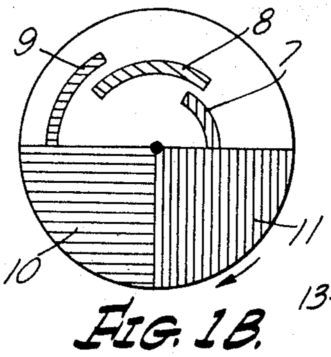
FIG. 1B illustrates another configuration of Benham-type disc.

FIG. 1B shows another Benham-type disc illustrating two methods for extending the physical colored areas so as to obtain a better ratio of physical color to white arc areas (such as 6), and thereby to proportionately reduce the white flash and increase the total physical color saturation. This in turn provides higher saturation from the combined physical and subjective colors.

As in FIG. 1B, arc segment 7 is the subjective red creating line and is composed of a piece of red paper. Arc segment 8 is the subjective green creating line and is composed of a piece of green paper. Arc segment 9 is a subjective blue creating line and is composed of a piece of blue paper. Note that line 8 has been extended to encompass twice the angular length of line 4 in FIG. 1A. This creates a better subjective green and increases the ratio of physical green to physical white thereby reducing the white flash. Also, lines 7, 8 and 9 can be made somewhat longer if the speed of rotation is increased. Their duration is thereby maintained whereas the white arc areas (such as 6) are reduced in duration and cause less white flash at slow speeds or desaturation at high speeds.

In FIG. 1B sectors 10 and 11 replace sector 1 of FIG. 1A which was black. Sector 10 is a physical blue color and sector 11 is a physical red color in our example. These can be made of Munsell papers 7.5 PB 3/10 and 5.0 R 5/10, respectively. When the disc turns clockwise, sector 10 follows line 9 extending the durations of physical blue, and sector 11 of the disc precedes line 7 extending the duration of the physical red. Sectors 10 and 11 are presented to the eye at a speed (5 or more r.p.s.) fast enough for them to blend into a magentish gray-white color which causes less flicker than black sector 1 of FIG. 1A. Also, the flicker (white flash) in lines 7 and 9 is less because their duration is longer.

Figure 2:
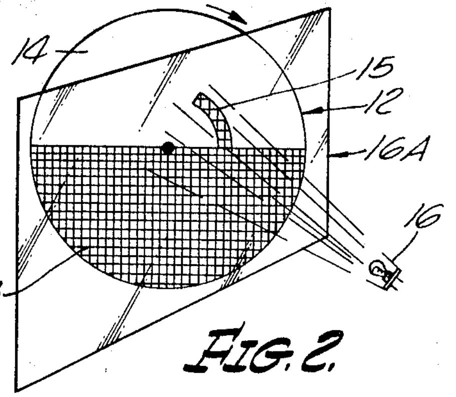
FIG. 2 illustrates a Benham-type disc illuminated by a physical colored lamp.

Another method of combining physical color and subjective color is to use colored lights for the physical color. FIG. 2 illustrates Benham-type disc 12 with black sector 13, white sector 14 and black arc segment line 15, which creates subjective red when the disc is rotated clockwise. Flood lamp 16 illuminates disc 12 with physical red light. It is assumed, as with FIGS. 1A and 1B, that disc 12 is also illuminated by ambient white light. When disc 12 is stationary, some of the red light is seen in arc 15 and sector 13 and they appear a dim physical red color. White sector 14 continues to appear white despite the physical red light falling on it because the eye and brain select it as the "reference white." When disc 12 is turning, the physical red light combines with the subjective red created by line 15 and causes a more saturated red to appear in line 15. Likewise a physical green or blue light can be combined with subjective green or subjective blue respectively to make them appear more highly saturated. This method is not very efficient because black arc line 15 absorbs a high percentage of light.

An alternate method is to direct physical red lamp 16 at the eye and the diffusion of red light across the retina causes the black areas to appear red. Another method is to direct lamp 16 at a semi-reflecting surface **16*a* between the eye and disc 12 and view the combined image of disc 12** and the physical red light reflected thereon.

Figure 3:
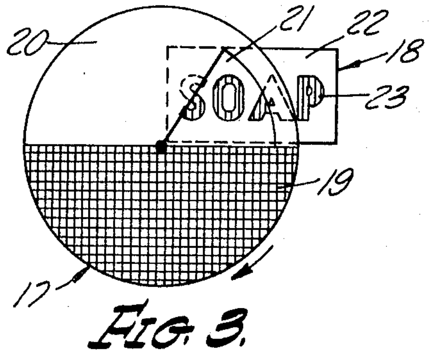
FIG. 3 is a perspective view illustrating a Bidwell-type disc used with an advertising display.

A method of combining subjective and physical colors by a Bidwell-type disc is shown in FIG. 3. Here disc 17 rotates in front of a display 18. Disc 17 has a black sector 19, a white sector 20 and a transparent sector 21 through which display 18 is viewed. Display 18 has white background 22, upon which appears image 23 which is the word "SOAP" in physical red color. It will be apparent that the image 23 can be a trademark, design, ad text, etc. The image may be created by red paint, red ink or red material, or it may be red lighting, such as neon tubes. White background 22 corresponds to the white areas 14 on each side of line 15 in FIG. 2; and image 23 corresponds to line 15. The disc 17 and the display 18 are illuminated with white light so that the white sector 20 and the white background 22 are about the same intensity of illumination. When disc 17 is spun slowly clockwise, image 23 appears a subjective red. This subjective red combines with its physical red color to make image 23 appear more saturated than either its subjective or physical colors alone.

Figure 4A:
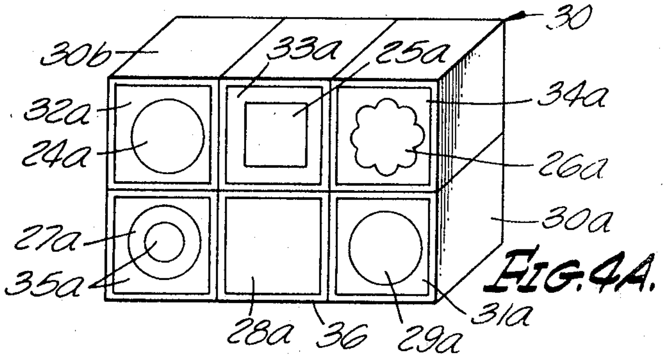
FIG. 4A is a perspective view of a bank of signal lamps, wherein the principle of combining subjective and physical colors is illustrated.
Figures 4B, 4C:
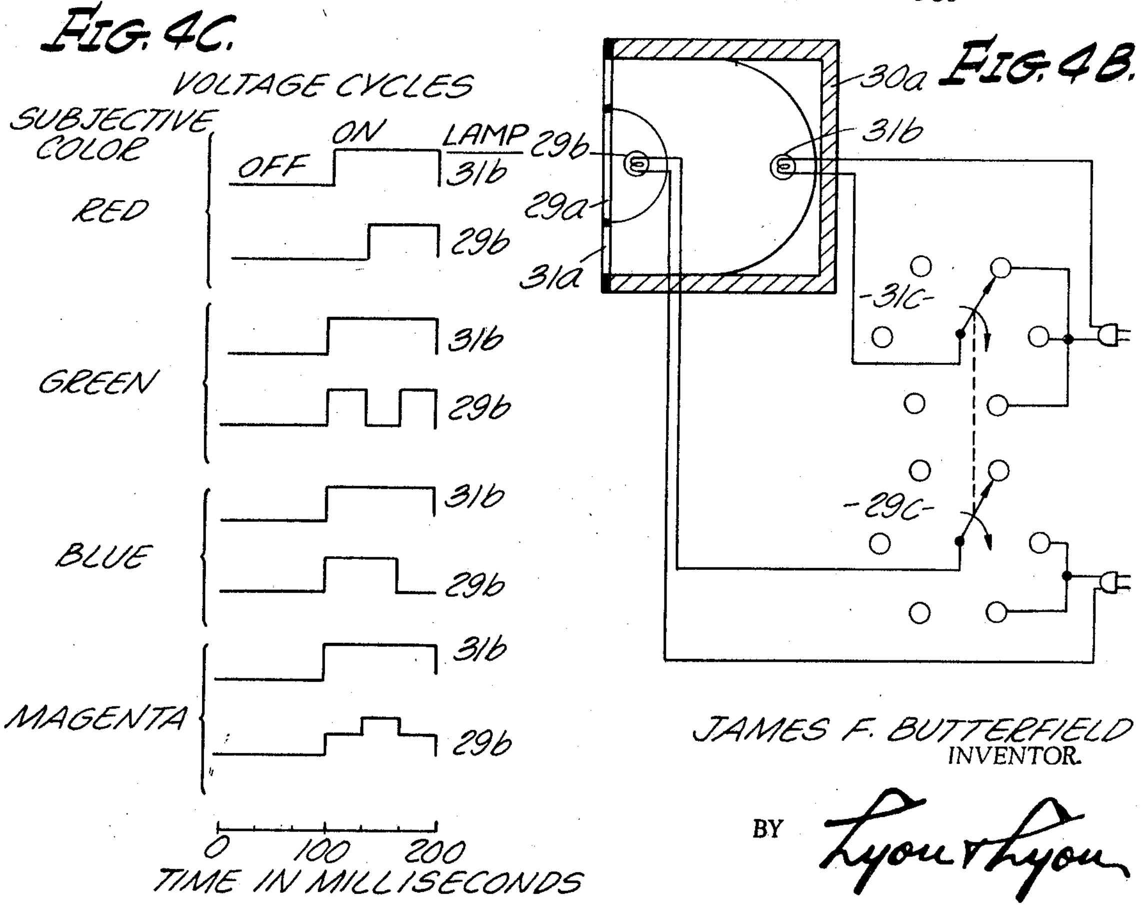
FIG. 4B is a cutaway side view of one of the signal lamps of FIG. 4A.
FIG. 4C is a graph showing the voltage cycles used in causing the lamp of FIG. 4B to appear in various subjective colors.
Figure 4D:
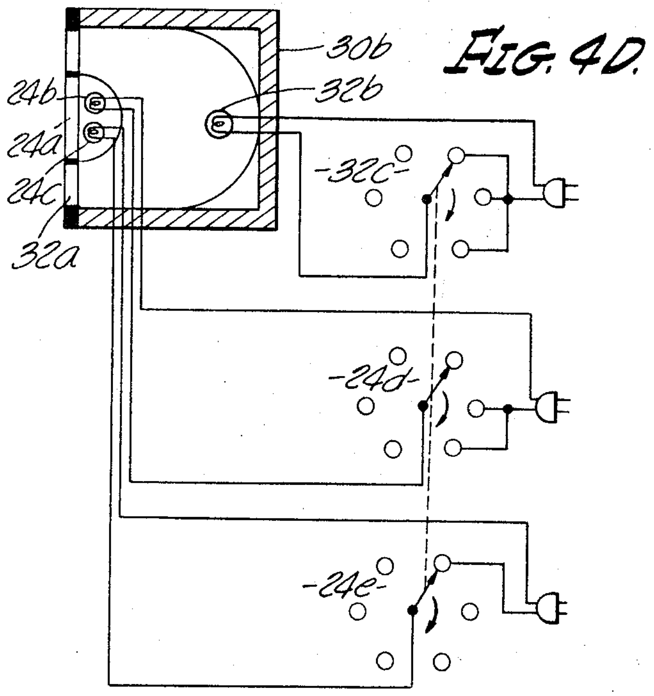
FIG. 4D is a cutaway side view of another of the lamps of FIG. 4A.

FIG. 4A illustrates a bank of signal lamps in a housing 30. Each lamp consists of a back illuminated translucent screen(s). A screen 24A is illuminated by a white light 24B (FIG. 4D) and a physical red light 24C. Screens 25A, 26A and 27A are rear illuminated by white lights and physical colored lights (these latter lights are not shown for simplicity of illustration). Screens 28A and 29A are illuminated by physical white lights 28B and 29B respectively (FIGS. 4F and 4B). Screen 31A is illuminated by a white light 31B. Screen 32A is illuminated by a white light 32B (FIG. 4D). Screen 33A is illuminated by a white light (not illustrated). Screen 34A is illuminated by a white light (not shown), and screens 35A are illuminated by a white light (not shown ).

FIG. 4B shows a cutaway side view of one of the lamp housings 30A. White light 31B is connected through switch 31C to the power main. Light 29B is connected through switch 29C to the power main. Switches 31C and 29C operate in synchronism. All switches herein are illustrated only in diagrammatical form and each mechanism can be mechanical or electronic. Although the fixed contacts of the switches are shown only as circles this is done for simplifying illustration thereof, and in actual practice these contacts are longer (such as arcuate) so that the space between fixed contacts is relatively small.

FIG. 4C illustrates graphically on-off voltage cycle sequences and their duration in milliseconds of white lights 29B and 31B. These voltage cycles are required for screen 29A to appear respectively subjective red, or subjective green, or subjective blue, or subjective magenta in color, and are generated by various configurations of switch 29C (which is shown for the generation of subjective red). To obtain magenta, the voltage of lamp 29B is turned on partially, then fully, then partially. In each case, screen 31A appears white. Screens 29A and 31A have a slow flicker. Subjective color alone, as is created in this manner, is not saturated.

In FIG. 4D lamp housing 30B is shown in a cutaway side view. Switches 32C, 24D and 24E are connected respectively to white light 32B, white light 24B and physical red light 24C.

Figure 4E:
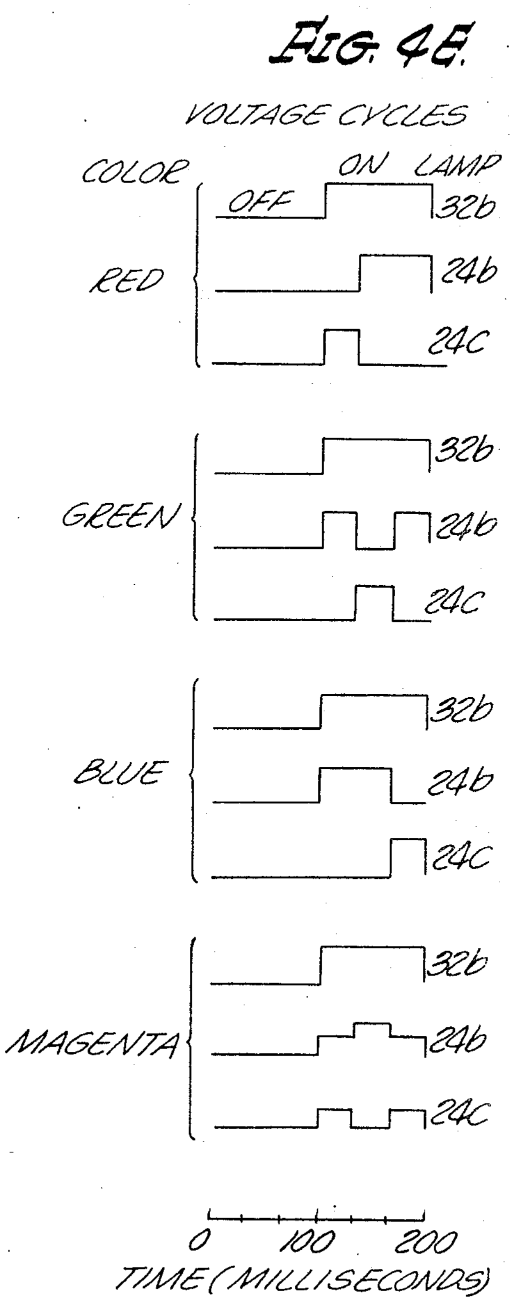
FIG. 4E is a graph of the voltage cycles used in causing the lamp of FIG. 4D to appear in highly saturated colors.
Figure 4F:
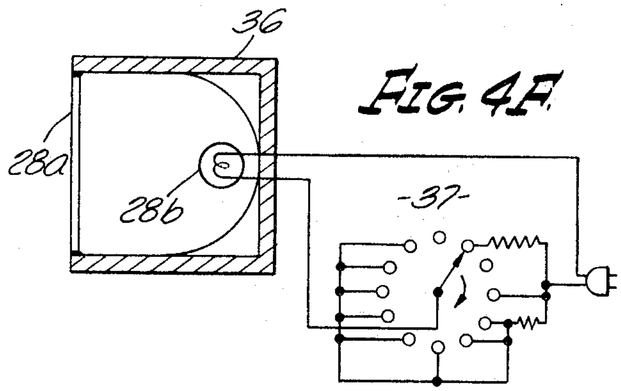
FIG. 4F is a cutaway side view of another of the lamps of FIG. 4A.

When the red voltage cycle sequences of FIG. 4E are applied by switches 32C, 24D and 24E (shown for the generation of saturated red) to lights 32B, 24B and 24C of FIG. 4D, screen 24A appears a saturated red. If the light 24C is a physical green and the green voltage cycles of FIG. 4E are applied to the light 24C, white light 24B and white light 32B, then screen 24A will appear a saturated green. If the light 24C is a physical blue and the blue voltage cycles are applied to the light 24C, white light 24B and white light 32B, then screen 24A will appear a saturated blue. If the light 24C is a physical magenta and the magenta voltage cycles are applied to the light 24C, white lamp 24B and white lamp 32B, then screen 24A will appear a saturated magenta. If green voltage cycles of FIG. 4E are applied to physical red light 24C, white light 24B and white light 32B, then screen 24A will appear yellow. In FIG. 4A the physical colored lights must be of a higher wattage than the white lights so that the illumination output of all lights is about the same.

In FIG. 4A, it is assumed that all lights are of a type which can be turned ON and OFF within brief periods, which in these examples are 5 times per second. Incandescent lights cannot normally be turned ON or OFF at these speeds. However, in some cases, an incandescent lamp can be maintained at a low level of illumination so that during the OFF periods it is actually "on" very dimly and during the ON periods it is "on" very brightly. Then more rapid fluctuation of the filament temperature is possible. Fluorescent lights and electric discharge lights (such as neon, sodium, mercury, etc.) can be turned ON and OFF at high speeds and are particularly useful for this purpose. With some of these types of lights there is also the requirement of maintaining a constant low base voltage.

Some subjective color effect and therefore added saturation is achieved if the physical red colored light 24C is maintained ON continuously and only light 32B is turned ON and OFF. In fact, any physical colored light will have an enhanced saturation if an adjoining light is turned ON and OFF with corresponding voltage cycles.

Figure 4G:
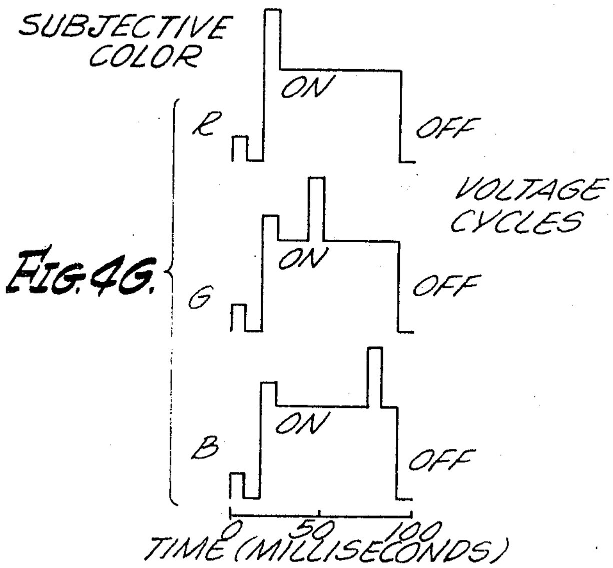
FIG. 4G is a graph of the voltage variations used in causing the lamp of FIG. 4F to appear in highly saturated colors.

FIG. 4F is a cutaway view of housing 36. Here is shown white light 28B and reflector and translucent screen 28A and switch 37. This arrangement does not include the white surround created in FIG. 4B by translucent screen 31A and light 31B. In this case the entire screen 28A appears in color. However, the modulation voltage is more complex in nature. The Benham-type of subjective color is apparently produced by the ON-OFF cycles of the high contrast (black and white areas) acting across a common border. For example in FIG. 1A a subjective red color is created in the black area of line 3 when this interacts against the white area 2 located on each side of it and the white arc 6 succeeding it. The large dark area 1 is a discharge area and serves to discharge the eyes' receptors before another code sequence is sent. If line 3 is thin, the subjective red color from the edges spreads across its entire width. However, if line 3 is thick the subjective red color will only be seen at the edges and the center area thereof will appear black. The high contrast interaction seems to cause a red coded signal to arise only from those immediate areas of the eye where the interaction takes place. The subjective color effect illustrated in FIGS. 4F and 4G is of a different nature. Here a complex modulation of light signals in increments from full OFF to full ON apparently causes the entire area of the eye to create a color signal. Where in the first case of the high contrast interaction a limited area caused a color coded signal to be sent from the eyes' receptors to the brain, now in the later case a complex modulation of a light signal over any sized area causes a color coded signal to be sent from those receptors to the brain. In each case there is a unique modulation of the light signal termed a subjective colored code, which determines the character of the color seen.

FIG. 4G illustrates an example of the complex voltage cycle sequences required respectively for subjective red, subjective green or subjective blue, with the $x$ axes being time and the $y$ axes being voltage which determines light intensity from off to full on. The OFF period is considerably reduced. This permits more sequences per second (in this example, ten r.p.s.) and considerably reduces the flicker. The voltage cycles are illustrated in digital form but they preferably should be analog in nature. The various voltage magnitudes may be provided by suitable valued resistors coupled with the switch 37. In this case, light 28B needs to be capable of very rapid changes in intensity. Instead of utilizing white light 28B, appropriate colored light could be used thereby providing higher color saturations.

Signal arrangements as illustrated in FIG. 4A normally have a circular configuration as seen at 24A. However, the Benham-type of subjective color appears to be an edge effect which in FIG. 1A occurs between lines 3, 4 or 5, and the white portion of section 2 which lies on each side of these lines. It has been determined that the longer the edge between the surround and the line per unit area, the greater the subjective color in this area. Also thick lines tend to have good color at their edges and darker colors or black in their center, therefore thinner lines are desirable.

In FIG. 4B, screen 29A corresponds to lines 3, 4 or 5 of FIG. 1 and screen 31A corresponds to white sector 2 of FIG. 1. However, screen 29A is circular in shape and has the minimum possible edge or border. Screen 25A in FIG. 4A has been made square in shape and has a greater border. Screen 26A has a flower-like shape and has considerable border. Screen 27A is ring-like in shape; its center hole is part of screen 35A. Screen 27A, therefore, has an inner and outer border which assures all areas of screen 27A are close to a border. Screen 28A operates on a different principle of subjective color as described above (col. 8, lines 35 through 62). The entire area creates subjective color without a border being present.

Figures 5A, 5B, 5C, 6A, 6B, 6C:
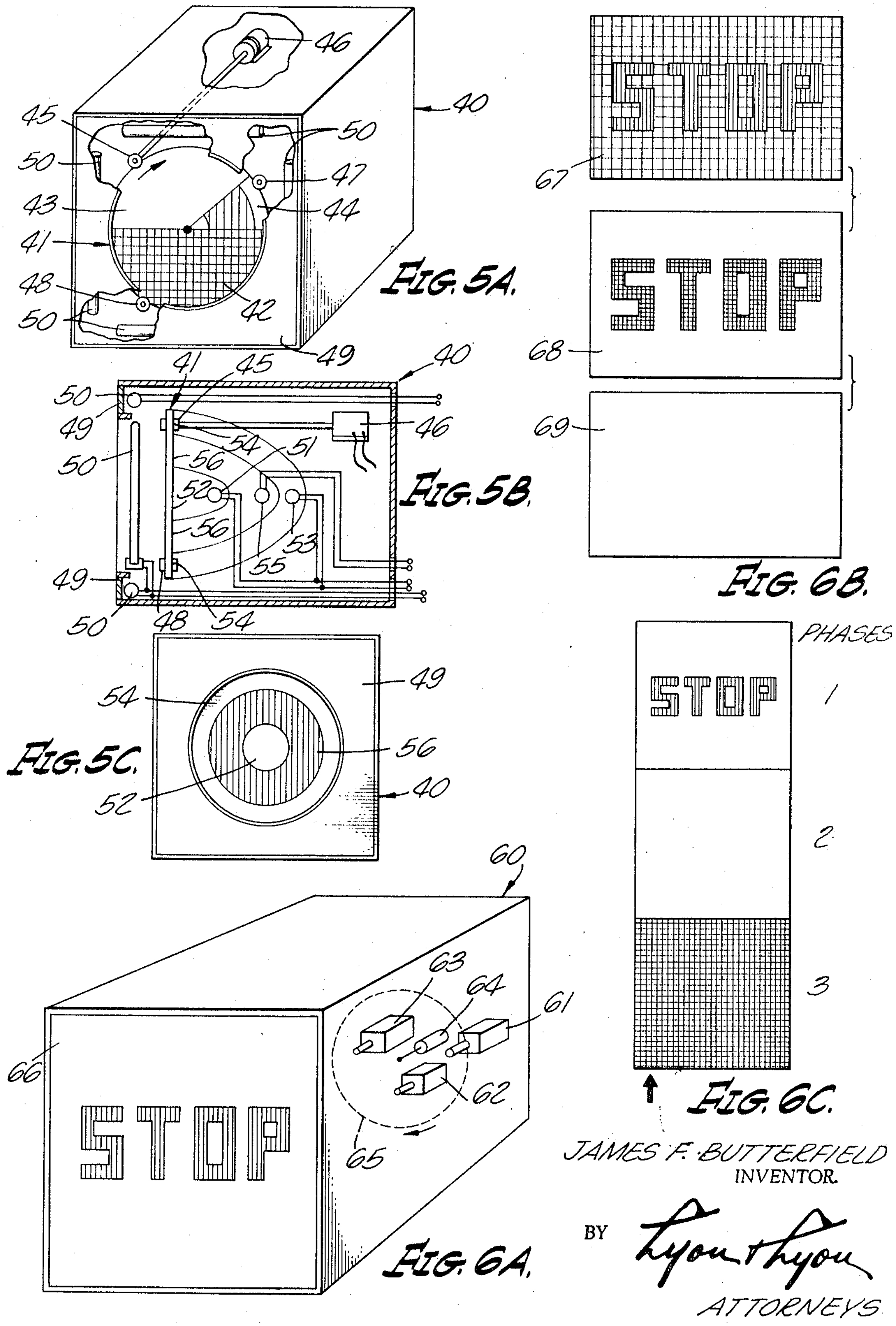
FIG. 5A is a perspective view of a signal light in which a modified Bidwell-type disc is utilized.
FIG. 5B is a cutaway side view of the signal light of FIG. 5A.
FIG. 5C is a front view of the signal light of FIG. 5A.
FIG. 6A is a perspective view of a signal light using slide projectors and a Bidwell-effect disc.
FIG. 6B illustrates three slides used in the slide projectors of FIG. 6A.
FIG. 6C illustrates diagrammatically the phase sequence used in the signal light of FIG. 6A.

FIGS. 5A through 5C illustrate another type of signal lamp. Housing 40 contains a modified Bidwell-type disc 41. This disc consists of opaque black sector 42, opaque white sector 43 and translucent screen sector 44. Disc 41 corresponds in nature to disc 17 of FIG. 3. Disc 41 is driven by means of driver wheel 45 and motor 46. Idlers 47 and 48 support disc 41. Disc 41 turns clockwise at a speed of approximately 5 r.p.s. Translucent front screen 49 is illuminated by lights 50.

FIG. 5B shows a cutaway side view of housing 40. Disc 41 is also illuminated by white lights 50 and held at a steady level of illumination. White lamp and reflector 51 illuminate the central portion 52 of screen 44. Lamp 51 is connected in parallel with white lamp 53 which illuminates the outer portion 54 of screen 44. Portions 52 and 54 are at the same level of illumination as white sector 43. Physical red lamp 55 illuminates the middle ring 56 of screen 44.

When disc 41 revolves, the front of housing 40 appears as is illustrated in the front view of FIG. 5C. Middle ring 56 appears a highly saturated flashing red. Areas 52 and 54 appear flashing white. Screen 49 appears a steady white. The speed of rotation of the disc 41 typically is approximately three to twenty revolutions per second.

FIGS. 6A through 6C illustrate another form of signal light. In this case, housing 60 contains projectors 61, 62 and 63 along with motor 64 to drive disc 65 which gives a Bidwell effect of a succession of images on black translucent (light transmitting screen which appears black in normal ambient light when there is no light projected from behind) screen 66. Projectors 61, 62 and 63 contain steady physical white light sources. Projector 61 has opaque slide 67 of FIG. 6B in it. This slide has the word "STOP" in physical red translucent letters. Projector 62 contains transparent slide 68 which has the word "STOP" in opaque black letters on a translucent white background. Projector 63 illuminates screen 66 with white light by means of translucent slide 69. Disc 65 has apertures and masks, i.e., an opaque shutter with slots therein which transmit or block the light from the three projectors.

FIG. 6C illustrates the three phases which appear on screen 66. First, disc 65 permits slides 67 and 68 to be projected superimposed so that the word "STOP" appears in physical red against a white background. Next, disc 65 permits slide 69 to be projected so that the entire screen 66 appears white. Finally, disc 65 blocks all projected light and the entire screen 66 appears black. Disc 65 turns clockwise at about 5 r.p.s. The above described repetition causes the word "STOP" to appear flashing in highly saturated red on screen 66.

Figures 7A, 7B, 10A, 10B:
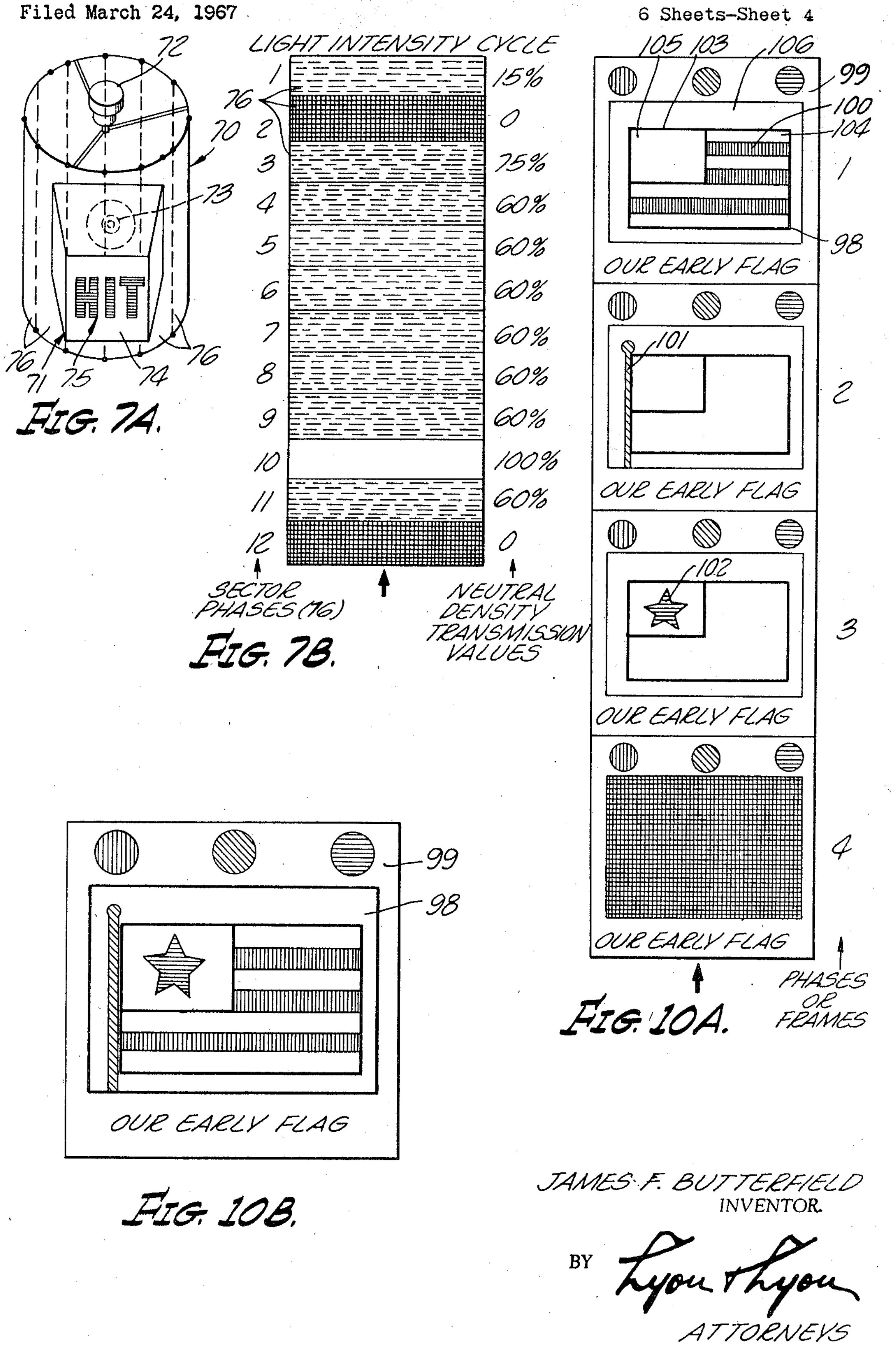
FIG. 7A illustrates a configuration of a signal light in which a drum of neutral density filters and masks is employed.
FIG. 7B illustrates the neutral density value of the various sectors of the drum used in FIG. 7A.
FIG. 10A illustrates an example of the phases used when combining subjective color and physical color on color television or color motion picture film.
FIG. 10B illustrates the resulting reproduction of the scene of FIG. 10A.

Obviously in the illustration shown in FIG. 6 as well as in the illustration shown in FIG. 5, electronic switches are not required to turn the lights on and off since the disc with a Bidwell effect performs this function. Therefore, incandescent lamps may be used rather than the gaseous lamps which were required in FIG. 4 because of the rapid on and off fluctuation. Also rather than using disc 65 the means of FIG. 6 could employ individual shutters in front of each projector. These shutters could be operated by electrical, mechanical or pneumatic means in the proper sequence. While FIG. 6 illustrates a rear projection means, front projection could also be employed. FIGS. 7A and 7B illustrate the use of drum 70, rather than a disc in connection with signal light housing 71. Drum 70 is rotated by motor 72. Signal light housing 71 contains white lamp and reflector 73 which back illuminates white translucent screen 74 with blue translucent letters "HIT" 75. Sectors 76 (shown layed flat in FIG. 7B) are 12 filters and masks on drum 70.

FIG. 7B shows the light intensity cycle sequence created by 10 neutral density filters and 2 masks of sectors 76 on drum 70. The filter transmission percentages are given for phases 1 and 3 through 11. Phases 2 and 12 have opaque masks.

Drum 70 rotates at 10 r.p.s. giving the word "HITS" a saturated blue color. The subjective effect utilized here is the same one utilized in lamp 28B of FIG. 4F, and the filters and masks reproduce the voltage variation for blue shown in FIG. 4G. This and other of the apparatus illustrate how many of the color-blind can know the physical color of a signal or display because they see a subjective color the hue of which matches the physical color of the light.

Figures 8A, 8B, 8C:
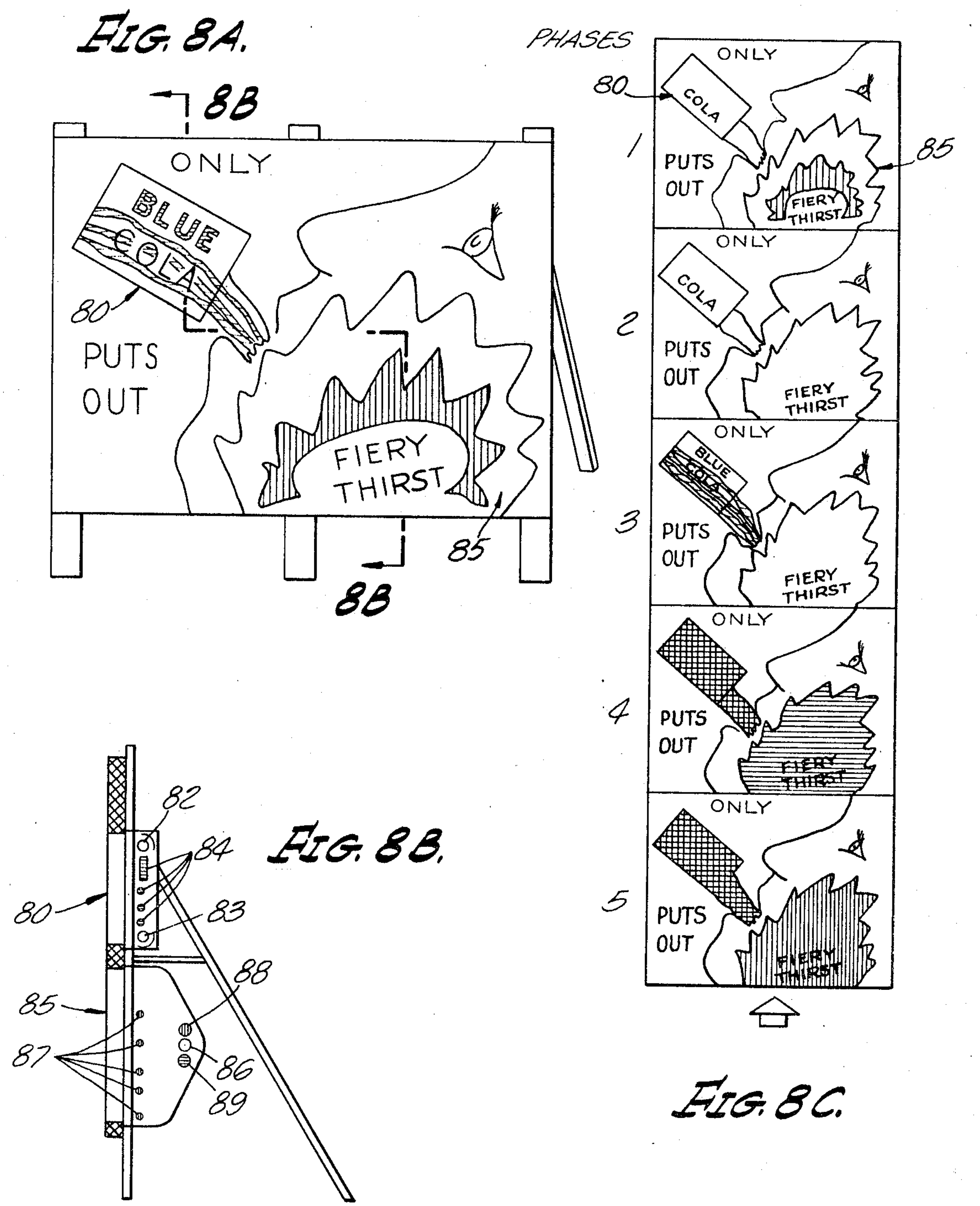
FIG. 8A is a perspective view of an advertising display.
FIG. 8B is a cutaway side view of the advertising billboard of FIG. 8A.
FIG. 8C illustrates the various phases of the advertising display of FIG. 8A.

FIGS. 8A through 8C illustrate the application of the combination of subjective and physical colors to an illuminated advertising billboard. The painted billboard has, in this example, black translucent (similar to screen 66 of FIG. 6A) screen 80 (cola can and liquid flowing from can) which normally appears blue and black and white because it is back illuminated by lights, illustrated in FIG. 8B. Lights 84 illuminate the word "BLUE" and the crest of the waves with a physical blue color. Lights 82 and 83 simultaneously illuminate the trough of the waves and the top background white. When lights 84 are out, lights 82 and 83 illuminate the entire screen 80 white. The word "COLA" is black at all times. When lights 82, 83 and 84 are off, translucent screen 80 appears black.

Likewise black translucent screen 85 normally appears red and white because lights 87 give a physical red outline to the fire; and light 86 illuminates the central and surrounding portions of screen 85 white. When lights 87 are off, the entire area is illuminated white by light 86. When lights 86 and 87 are off, physical red light 88 is turned on to illuminate the entire screen red. Then light 88 is turned off and physical blue light 89 is turned on to illuminate the entire screen blue. The words "Fiery Thrist" are black at all times.

FIG. 8C illustrates the sequence of 5 phases which screen 80 and 85 go through to create highly saturated color images. This sequence can be obtained by using switches similar to those drawn in FIG. 4D and voltage cycles as illustrated in FIG. 4E to turn on and off lights, 82, 83, 84, 86, 87, 88 and 89 at the proper times. Area 80 is shown as going through black phase(s) which correspond to sector 1 of the disc in FIG. 1. Area 85 is shown going through all blue and all read phases which correspond to areas 10 and 11 of the disc illustrated in FIG. 1B. Areas 80 and 85 need not be in phase or synchronized with each other so long as they each go through the proper sequences.

Figure 9:
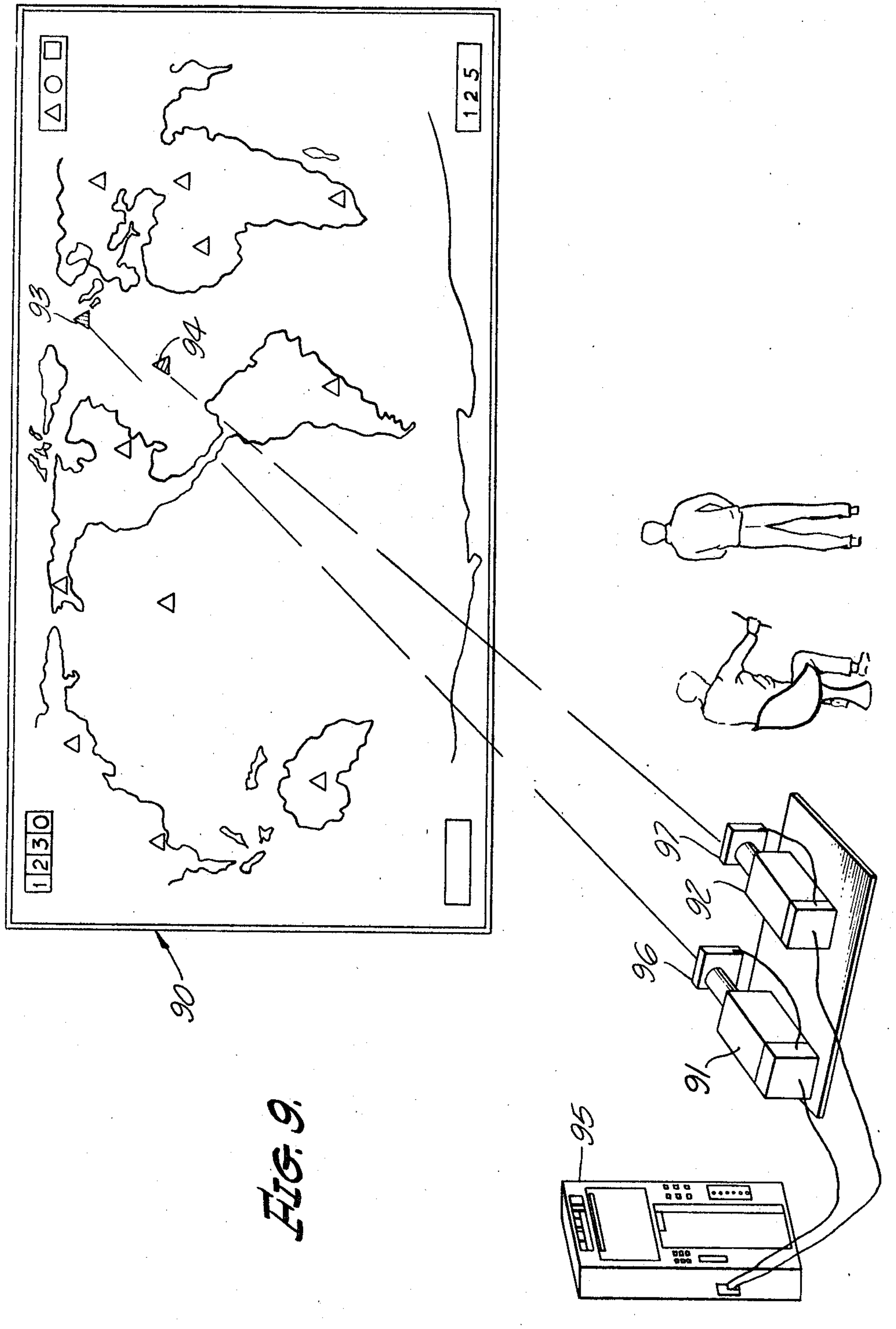
FIG. 9 is a perspective view of a command room display utilizing slide projectors with computer controlled shutter mechanisms.

FIG. 9 illustrates another application for the combination of subjective and physical colors. Here command board 90 is being observed in a briefing room. Projectors 91 and 92 are projecting symbols 93 and 94 of enemy and friendly missiles. Symbol 93 is in physical red color and symbol 94 is in physical green color. The position and movement of symbols 93 and 94 are being plotted by computer 95 which drives projectors 91 and 92.

On projector 91 is subjective color coding shutter mechanism 96 and on projector 92 is subjective color coding shutter mechanism 97 which are also driven by computer 95. Mechanism 96 modulates the light from projector 91 through the subjective red voltage cycle shown in FIG. 4G. Mechanism 97 modulates the light from projector 92 through the green voltage cycle shown in FIG. 4G. Images 93 and 94 can therefore be made to appear highly saturated, which will cause them to stand out from other physical color images on command board 90.

FIGS. 10A and 10B illustrate how subjective color can be added to physical colored motion picture film, physical colored television or other visual communication means. Illustrated here are four phases or frames which comprise one sequence of subjective color being added to a physical color film strip or to physical color television. Each frame is divided into color creating area 98 and surround area 99. The colors in surround area 99 are identical in all frames. In color creating area 98 the first frame shows stripes 100 of the flag in physical red; the second frame shows flag pole 101 in physical green; the third frame shows star 102 in physical blue; and the fourth frame is opaque. In frames 1, 2 and 3 the outline 103 of the flag is black, and the white stripes 104, field 105 and background 106 are white. In this example, in area 98 this sequence is repeated over and over 6 sequences per second for 24 frames per second sound film projection. Or if the sequence is used with television it is repeated 7.5 times per second for a 30 frame television system.

FIG. 10B illustrates the picture as reproduced on the screen. The colors in area 98 are now highly saturated because of the addition of subjective color to the physical color of the communication medium (these can be compared to the normally saturated physical colors in area 99). This corresponds to FIG. 1; however, rather than the blur circles resulting in FIG. 1 there is a complex image reproduced in FIG. 10B. The subjective color is added to the physical colored image only in area 98 which has a flash or flicker; the balance of the raster remains steady.

From the foregoing description, it is evident that the present invention provides methods and apparatus for obtaining highly saturated colored lights and images. This invention is also applicable to radar, computer readouts and other signaling, advertising and communication systems.

The present embodiments of this invention are to be considered in all respects as illustrative and not restrictive.

What is claimed is:

1. A method of obtaining color stimuli by combining physical color with subjective color stimuli comprising
providing physical chromatic color from light source means, and modulating light from said light source means in accordance with a subjective color stimuli producing code.

2. A method as in claim 1 wherein
said light source means is a color cathode ray tube, and said physical color and said subjective color stimuli are combined by modulating colored light from the phosphor of said cathode ray tube in accordance with said subjective color stimuli producing code.

3. A method as in claim 1 wherein
said light source means is a lamp source, and said physical color and said subjective color stimuli are combined by modulating colored light from said lamp source in accordance with said subjective color stimuli producing code.

4. A method as in claim 1 wherein
said light source means is a fluorescent color means, and said physical color and said subjective color stimuli are combined by modulating colored light from said fluorescent color means in accordance with said subjective color stimuli producing code.

5. A method as in claim 1 wherein
said light source means is a laser source, and said physical color and said subjective color stimuli are combined by modulating colored light from said laser source in accordance with said subjective color stimuli producing code.

6. A method as in claim 1 wherein
said light source means is a color reflecting surface of an element, and said physical color and said subjective color stimuli are combined by modulating light emanating from said color reflecting surface in accordance with said subjective color stimuli producing code.

7. A method as in claim 1 for obtaining mixed color stimuli wherein
said colored light source means has a first hue and said subjective color code produces a second different hue thereby resulting in a mixed color stimuli of a third hue.

8. A method as in claim 1 for obtaining highly saturated color stimuli wherein
said colored light source means has a hue substantially the same as that produced by said subjective color stimuli producing code thereby resulting in a highly saturated color stimuli of substantially the same hue.

9. A method of obtaining color stimuli by combining physical color with subjective color stimuli by modulating a physical chromatic color light source means in accordance with a complex subjective color stimuli producing code, comprising
a sequence of varying said physical color light source means in predetermined complex increments from off to on and back to off.

10. A method of producing highly saturated color stimuli on image display apparatus comprising
selecting an area in an image to be highly saturated,
coding said area in accordance with a subjective color stimuli producing code, and
exhibiting said coded area in physical chromatic color, said subjective color stimuli producing code being that for producing subjective color stimuli corresponding with the hue of said physical color.

11. A display apparatus for providing a subjective color stimuli and including display means having adjacent first and second portions wherein a highly saturated red color stimuli is produced by said second portion, comprising
a first illumination means for illuminating said first portion,
a second illumination means for illuminating said second portion, said first and second illumination means emanate white light,
switching means coupled with said first and second illumination means for turning on and off said first and second illumination means in modulation sequences in accordance with a subjective color stimuli producing code, and
a third illumination means which emanates physical red color light is disposed for illuminating said second portion, all said illumination means being turned on and off by said switching means in said modulation sequences, the intensity variations of each illumination means being substantially as follows:
said first illumination means being off during the first period of said sequence and on during the second period of the sequence,
said second illumination means being off during the first period of said sequence and continuing off and then on during the second period of said sequence, and
said third illumination means being off during the first period of said sequence and on, and then off during the second period of said sequence.

12. A display apparatus for providing a subjective color stimuli and including display means having adjacent first and second portions wherein a highly saturated green color stimuli is produced by said second portion, comprising a first illumination means for illuminating said first portion, a second illumination means for illuminating said second portion, said first and second illumination means emanate white light, switching means coupled with said first and second illumination means for turning on and off said first and second illumination means in modulation sequences in accordance with a subjective color stimuli producing code, and a third illumination means which emanates physical green color light is disposed for illuminating said second portion, all said illumination means being turned on and off by said switching means in said modulation sequences, the intensity variations of each illumination means being substantially as follows:

said first illumination means being off during the first period of said sequence and on during the second period of the sequence, said second illumination means being off during the first period of said sequence, and then on, off, and on during the second period of said sequence, and said third illumination means being off during the first period of said sequence, continuing off, then on, and then off during the second period of said sequence.

13. A display apparatus for providing a subjective color stimuli and including display means having adjacent first and second portions wherein a highly saturated blue color stimuli is produced by said second portion, comprising a first illumination means for illuminating said first portion, a second illumination means for illuminating said second portion, said first and second illumination means emanate white light, switching means coupled with said first and second illumination means for turning on and off said first and second illumination means in modulation sequences in accordance with a subjective color stimuli producing code, and a third illumination means which emanates physical blue color light is disposed for illuminating said second portion, all said illumination means being turned on and off by said switching means in said modulation sequences, the intensity vibrations of each illumination means being substantially as follows:

said first illumination means being off during the first period of said sequence and on during the second period of said sequence, said second illumination means being off during the first period of said sequence, on, and then off during the second period of said sequence, and said third illumination means being off during the first period of said sequence, continuing off and and then on during the second period of said sequence.

14. A display apparatus for producing subjective color stimuli comprising light source means, and means for modulating said light source means in accordance with a subjective color stimuli producing code by repetitively varying the intensity of said light means in predetermined increments at least from off to full on, and back to off, wherein physical chromatic color light emanates from said light source means, and the varying of the intensity of said light source means occurs in a modulation sequence in accordance with a code for a subjective color stimuli whose perceived hue is similar to the hue of the physical color of said light source means thereby resulting in a highly saturated color of a similar hue.

15. A display apparatus for producing a subjective color stimuli comprising display means having adjacent first and second portions, a first illumination means for illuminating said first portion, a second illumination means for illuminating said second portion, shutter means disposed for modulating light emanating from said illumination means in a modulation sequence in accordance with a subjective color stimuli producing code, and said second illumination means emanates a physical chromatic color light which illuminates said second portion, and said modulation sequence is in accordance with a code for a subjective color stimuli whose perceived hue is similar to the hue of said physical color.

16. A display apparatus for producing a subjective color stimuli comprising display means having adjacent first and second portions, a first illumination means for illuminating said first portion, a second illumination means for illuminating said second portion, shutter means disposed for modulating light emanating from said illumination means in a modulation sequence in accordance with a subjective color stimuli producing code, and said second illumination means emanates a physical chromatic color light which illuminates said second portion, said modulation sequence is in accordance with a code for a subjective color stimuli whose perceived hue is dissimilar to the hue of said physical color.

17. A display apparatus for producing color stimuli comprising first means for emanating physical chromatic color light, and modulator means for modulating said physical color light in accordance with a subjective color stimuli producing code.

18. A display apparatus for producing color stimuli comprising a display screen, a first white illumination means for illuminating said screen, a second chromatic colored illumination means for illuminating said screen, and a modulator means for modulating light from said first and second illumination means in accordance with a subjective color stimuli producing code.

19. A display apparatus for producing a highly saturated color stimuli comprising a physical chromatic color light source means of a first hue, and means for modulating the light emanating from said light source means in accordance with a subjective color stimuli producing code for producing subjective color of a similar hue.

20. A display apparatus for producing mixed color stimuli comprising a physical chromatic color light source means of a first hue, and means for modulating the light emanating from said light source means in accordance with a subjective color stimuli producing code for producing subjective color of a different hue.

(References on following page)

References Cited

Sheppard, Jr., "Temporal Factors in Subjective Colors," Rand Corporation Report RM-4770-ARPA, March 1966.

Frost, "Generation of Subjective Colors in an Electroluminescent Display," IEEE Int'l Conv. Record, vol. 13, Part 8, 1965, pp. 14-20.

Chuyev, "Receiving Color on a Black and White Kinescope," 22d All Union Scientific Session. Devoted to radio day section on television (avail. from Commerce Clearing House—CFSTI) J. Prs.: 37518; TT66-33946. September 1966, pp. 38-42.

Cohen et al., "The Prevost Fechner-Benham Subjective Colors," Psych. Bul. 46(2), March 1949, pp. 97-136.

RONALD L. WIBERT, Primary Examiner

R. J. WEBSTER, Assistant Examiner

U.S. Cl. X.R.

40—106.52, 132; 352—42; 356—173; 552—45